US007986668B2

(12) United States Patent
Hashimoto

(10) Patent No.: US 7,986,668 B2
(45) Date of Patent: Jul. 26, 2011

(54) MOBILE TERMINAL AND METHOD FOR EXECUTING SCANNING OF RADIO SIGNALS

(75) Inventor: Jun Hashimoto, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 572 days.

(21) Appl. No.: 12/174,088

(22) Filed: Jul. 16, 2008

(65) Prior Publication Data
US 2009/0022109 A1  Jan. 22, 2009

(30) Foreign Application Priority Data

Jul. 17, 2007  (JP) .................. 2007-186063

(51) Int. Cl.
H04W 4/00 (2009.01)
H04W 36/00 (2009.01)
H04B 7/216 (2006.01)
H04J 3/16 (2006.01)

(52) U.S. Cl. ......... 370/331; 370/342; 370/465; 455/436

(58) Field of Classification Search ........................ None
See application file for complete search history.

(56) References Cited

U.S. PATENT DOCUMENTS
7,706,975 B2 *  4/2010  Farmer et al. .................. 701/213
2003/0050077 A1 *  3/2003  Takeuchi et al. .............. 455/456
2004/0116110 A1 *  6/2004  Amerga et al. ............ 455/422.1
2005/0181822 A1  8/2005  Sasaki et al.
2005/0239459 A1 * 10/2005  Katoh ........................ 455/432.1

FOREIGN PATENT DOCUMENTS
| JP | 9-55974 | 2/1997 |
| JP | 10-51852 | 2/1998 |
| JP | 2001-245361 A | 9/2001 |
| JP | 2003-522448 A | 7/2003 |
| JP | 2004-32337 A | 1/2004 |
| JP | 2006-20167 A | 1/2006 |
| JP | 2007-053607 A | 3/2007 |
| JP | 2007-081885 A | 3/2007 |
| WO | WO 2004/091244 A1 | 10/2004 |

* cited by examiner

Primary Examiner — Nittaya Juntima
(74) Attorney, Agent, or Firm — Oblon, Spivak, McClelland, Maier & Neustadt, L.L.P.

(57) ABSTRACT

The present invention provides a mobile terminal and a method of executing scanning for radio signals in the case where the mobile terminal is connectable to multiple radio communication systems employing different radio communication schemes. The mobile terminal and the method can scan for radio signals transmitted from a radio base station at an appropriate timing without modifying the existing radio base station or the like. The mobile terminal includes a WLAN controller configured to cause a WLAN communication unit to execute scanning for radio signals transmitted from an access point. Scanning is executed if a scrambling code determining unit determines that a scrambling code contained in notification matches a scrambling code stored in a scrambling code information storage, and if a position determining unit determines that a certain position indicated by position information stored in a GPS position information storage is within a predetermined distance from a current position of the mobile terminal.

5 Claims, 5 Drawing Sheets

MOBILE TERMINAL AND METHOD FOR EXECUTING SCANNING OF RADIO SIGNALS

BACKGROUND OF THE INVENTION

1. Technical Field

The present invention relates to a mobile terminal connectable to multiple radio communication systems employing different communication schemes, and a method for the mobile terminal to execute scanning for radio signals.

2. Description of the Related Art

Recently, radio communication systems such as cellular phone systems and wireless LAN systems are becoming popular. Accordingly, mobile terminals connectable to multiple radio communication systems employing different radio communication schemes are provided.

Such a mobile terminal connectable to multiple radio communication systems is required to detect a radio base station (access point) connectable from the location of the mobile terminal that changes frequently. Thus, the mobile terminal executes periodic scanning for radio signals transmitted from a radio base station constituting each radio communication system, to acquire notification (such as a scrambling code of the Code Division Multiple Access (CDMA) standard) contained in the radio signal.

A mobile terminal connectable to multiple radio communication systems is required to execute scanning for radio signals more frequently than a mobile terminal connected to a single radio communication system. This causes a drawback in increased electric power consumption and decreased available communication time and available standby time.

Hence, in order to solve the above problem, a method is known in which notification of a radio base station constituting a first radio communication system is included in a radio signal transmitted from a radio base station constituting a second radio communication system (e.g., see WO 04/091244, (p.p. 6 to 7, FIG. 1). According to such method, the mobile terminal only has to scan for a radio signal transmitted from the radio base station constituting a particular radio communication system, and thus electric power consumption can be reduced.

However, the above-mentioned conventional method includes the following problem. Specifically, in order to include notification of a radio base station constituting a first radio communication system in a radio signal transmitted from a radio base station constituting a second radio communication system, the method requires massive modification of an existing radio base station (or base station controller), such as changing a signal format transmitted by the radio base station.

The present invention has been made in view of the foregoing circumstances, and aims to provide a mobile terminal and a method for executing scanning for radio signals. The mobile terminal and the method are capable of executing scanning for radio signals transmitted from a radio base station at an appropriate timing, without modifying the existing radio base station or the like. Here, the mobile terminal is connectable to multiple radio communication systems employing different radio communication schemes.

SUMMARY OF THE INVENTION

To solve the above-mentioned problem, the present invention has the following aspects. A first aspect of the present invention is a mobile terminal (mobile terminal 100) connectable to a first radio communication system (cellular phone system 1) in accordance with the Code Division Multiple Access standard and a second radio communication system (wireless LAN system 2). The second radio communication system has a different radio communication scheme from the first radio communication system and includes a second radio base station. The mobile terminal includes a notification receiver, a storage, a position measuring unit, a spreading code determining unit, a position determining unit, and a scanning unit.

The notification receiver (CDMA communication unit 101) is configured to receive a notification (SIB11) containing a spreading code (e.g. SC101) from the first radio base station. The spreading code is assigned to a first radio base station constituting the first radio communication system (e.g. radio base station 10A) and is also assigned to another radio base station (e.g. radio base station 10B) which is separated from the first radio base station by a predetermined distance or more.

The storage (scrambling code information storage 107 and GPS position information storage 115) is configured to store neighboring base station information (scrambling code information 107a and GPS position information 115a) in which the position information indicating the second radio base 6 station and a certain position near the second radio base station (e.g. latitude/longitude information) is associated with the spreading code.

The position measuring unit (GPS signal processor 111) is configured to measure a current position of the mobile terminal. The spreading code determining unit (scrambling code determining unit 105) is configured to determine whether or not the spreading code contained in the notification received by the notification receiver matches the spreading code contained in the neighboring base station information.

The position determining unit (position determining unit 113) is configured to determine whether or not the certain position indicated by the position information contained in the neighboring base station information is within a predetermined distance (e.g. 1 km) from the current position measured by the position measuring unit.

The scanning unit (WLAN communication unit 121 and WLAN controller 123) is configured to execute scanning for radio signals (beacon) transmitted from the second radio base station in the following case.

That is, scanning is executed if the spreading code determining unit determines that the spreading code contained in the notification matches the spreading code contained in the neighboring base station information, and also if the position determining unit determines that the certain position indicated by the position information is within the predetermined distance from the current position.

The mobile terminal according to the first aspect can scan for radio signals transmitted from the second radio base station in a specific case. The scanning is executed if it is determined that the spreading code contained in the notification matches the spreading code contained in the neighboring base station information, and also if it is determined that the certain position indicated by the position information stored in the storage is within the certain predetermined distance from the current position of the mobile terminal.

As a result, the mobile terminal can scan for radio signals only when it can receive a radio signal transmitted from the second radio base station, that is, only when it can execute radio communication via the second radio communication system.

Specifically, the mobile terminal can scan for the radio signals transmitted from the second radio base station at an appropriate timing depending on the current position of the mobile terminal even in the following case. That is, scanning can be executed even when the same scrambling code assigned to a radio base station constituting the cellular phone system 1 and also assigned to other radio base stations separated from the radio base station by a predetermined distance or more is repeatedly assigned to different base stations.

In addition, the mobile terminal can scan at an appropriate timing by use of an existing radio base station. Thus, massive modification of an existing radio base station (or base station controller), such as a change of a signal format transmitted by the radio base station is unnecessary.

A second aspect of the present invention relates to the first aspect of the present invention. The position determining unit determines whether or not the certain position indicated by the position information is within the predetermined distance from the current position, if the spreading code determining unit determines that the spreading code contained in the notification matches the spreading code contained in the neighboring base station information.

A third aspect of the present invention relates to the first aspect of the present invention, and further includes a position information input accepting unit (information input accepting unit 131) configured to accept input of the position information. The storage stores the position information accepted by the position information input accepting unit.

A fourth aspect of the present invention relates to the first aspect of the present invention. The position measuring unit measures the current position by use of a signal from a GPS satellite (GPS satellite 30).

A fifth aspect of the present invention is a method of executing scanning for radio signals for a mobile terminal connectable to a first radio communication system in accordance with the Code Division Multiple Access standard and a second radio communication system. The second radio communication system has a different radio communication scheme from the first radio communication system and includes a second radio base station. The method includes the following steps. The method includes the step of receiving a notification containing a spreading code from the first radio base station, the spreading code assigned to a first radio base station included in the first radio communication system and also assigned to another radio base station which is separated from the first radio base station by a predetermined distance or more. The method further includes the step of storing neighboring base station information in which position information indicating the second radio base station and a certain position near the second radio base station is associated with the spreading code. The method further includes the step of measuring a current position of the mobile terminal. The method further includes the step of determining whether or not the spreading code contained in the received notification matches the spreading code contained in the neighboring base station information. The method further includes the step of determining whether or not the certain position indicated by the position information contained in the neighboring base station information is within a predetermined distance from the measured current position. The method further includes the step of executing scanning for radio signals transmitted from the second radio base station, if it is determined that the spreading code contained in the notification matches the spreading code contained in the neighboring base station information, and also if it is determined that the certain position indicated by the position information is within the predetermined distance from the current position.

DESCRIPTION OF THE PREFERRED EMBODIMENT

Figure 1:
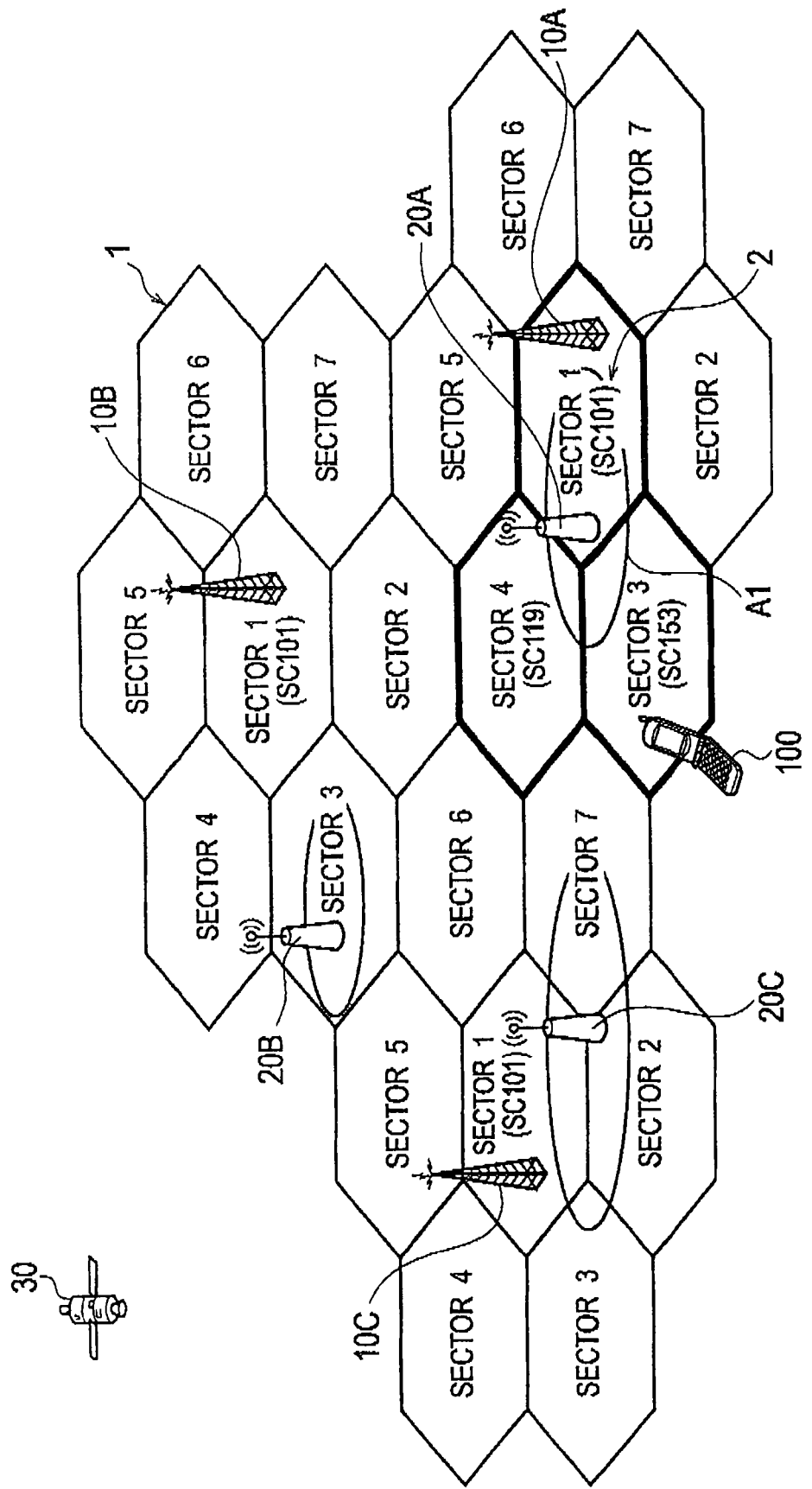
FIG. 1 is an overall schematic configuration diagram of a communication system according to an embodiment of the present invention.

An embodiment of the present invention will now be described. Specifically, explanation will be given on (1) an overall schematic configuration of a communication system, (2) a functional block configuration of a mobile terminal, (3) an operation of the mobile terminal, (4) advantageous effects, and (5) other embodiments.

In the drawings to be herein after described, the same or similar numerals are provided to the same or similar portions. Note that the drawings are only schematic and individual dimensional ratios, for example, are different from those in reality.

Accordingly, specific dimensions should be determined with reference to the following explanation. It goes without saying that dimensional relationships and ratios between different drawings also differ from those in reality.

(1) Overall Schematic Configuration of a Communication System

FIG. 1 is an overall schematic configuration of a communication system according to this embodiment. As shown in FIG. 1, the communication system according to this embodiment includes a cellular phone system 1, a wireless LAN system 2 and a mobile terminal 100.

The cellular phone system 1 is a so-called third-generation mobile communication system, employing the Code Division Multiple Access (CDMA) standard. In this embodiment, the cellular phone system 1 is configured to serve as a first radio communication system.

In the cellular phone system 1, multiple sectors (radio base stations) form an area communicable with the mobile terminal 100. Each sector is assigned a scrambling code (SC) from among several hundreds of SCs, that is, each sector is assigned a spreading code that has a longer a recurrence period than a channelization code. For example, SC101 is assigned to a radio base station 10A (sector 1).

Since the number of the scrambling codes is finite, the same scrambling code is also assigned to other radio base stations (e.g., radio base stations 10B and 10C) separated from the radio base station 10A by a predetermined distance or more. Although not shown in the diagram, each sector is formed by a radio base station that is similar to the radio base stations 10A to 10C. In this embodiment, the radio base stations 10A to 10C are configured to serve as first radio base stations.

The wireless LAN system 2 conforms to a wireless LAN standard specified by IEEE802.11 (e.g., IEEE802.11g). That is, the wireless LAN system 2 uses a radio communication system different from the cellular phone system 1. In this embodiment, the wireless LAN system 2 is configured to serve as a second radio communication system.

The wireless LAN system 2 includes access points 20A to 20C. In this embodiment, the access points 20A to 20C are configured to serve as second radio base stations.

Each of the access points 20A to 20C forms an area communicable with the mobile terminal 100. For example, the access point 20A forms an area A1 as the area communicable with the mobile terminal 100.

As shown in FIG. 1, areas communicable with the mobile terminal 100 are formed continuously by the multiple sectors (radio base stations) in the cellular phone system 1. On the contrary, the communicable areas formed by the access points 20A to 20C are scattered at particular places in the wireless LAN system 2. In other words, the mobile terminal 100 can be sometimes be connected to the wireless LAN system 2 and other times not, depending on the current position of the mobile terminal 100.

The mobile terminal 100 can be connected to both of the cellular phone system 1 and the wireless LAN system 2. Specifically, the mobile terminal 100 can execute radio communication with the radio base stations constituting the cellular phone system 1 (e.g., radio base stations 10A to 10C), as well as with the access points 20A to 20C constituting the wireless LAN system 2.

The mobile terminal 100 can receive a GPS signal transmitted from a GPS satellite 30, and measure the current position of the mobile terminal 100.

(2) Functional Block Configuration of a Mobile Terminal

Figure 2:
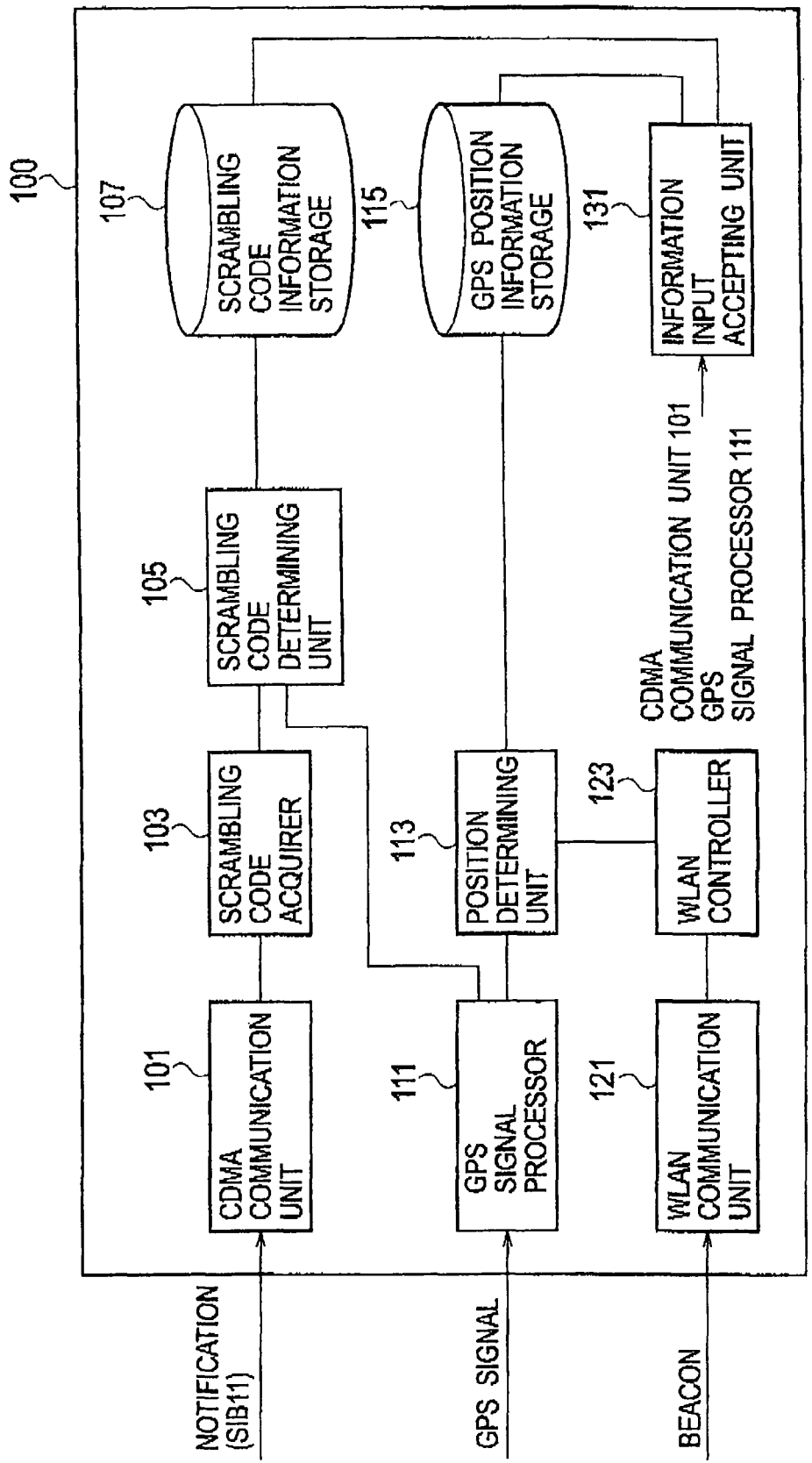
FIG. 2 is a functional block diagram of a mobile terminal 100 according to the embodiment of the present invention.

FIG. 2 is a functional block configuration of the mobile terminal 100. As shown in FIG. 2, the mobile terminal 100 includes the following components for executing radio communication with the cellular phone system 1: a CDMA communication unit 101, a scrambling code acquirer 103, a scrambling code determining unit 105, and a scrambling code information storage 107.

The mobile terminal 100 includes the following components for determining the current position of the mobile terminal 100: a GPS signal processor 111, a position determining unit 113, and a GPS position information storage 115. Furthermore, the mobile terminal 100 includes the following components for executing radio communication with the wireless LAN system 2: a WLAN communication unit 121 and a WLAN controller 123.

The mobile terminal 100 also includes an information input accepting unit 131 configured to accept information that is inputted by a user of the mobile terminal 100.

The CDMA communication unit 101 executes radio communication with the radio base stations constituting the cellular phone system 1 (e.g., radio base stations 10A to 10C) in accordance with the CDMA standard. Particularly in this embodiment, the CDMA communication unit 101 receives a notification (SIB11) transmitted from the radio base stations (sectors). In this embodiment, the CDMA communication unit 101 is configured to serve as a notification receiver.

The notification contains a scrambling code (e.g., SC101) assigned to the sector. The notification also contains scrambling codes assigned to sectors formed near that sector (neighboring sector information).

In the stand-by state, the CDMA communication unit 101 continuously receives radio signals containing the notification transmitted from radio base stations near the mobile terminal 100, and selects an optimum radio base station (sector) for executing radio communication. Specifically, the CDMA communication unit 101 acquires reception levels of the radio signals received from the radio base stations near the mobile terminal 100, and then selects the optimum radio base station (sector) based on the acquired reception levels.

The scrambling code acquirer 103 acquires a scrambling code contained in the notification received by the CDMA communication unit 101. The scrambling code acquirer 103 outputs the acquired scrambling code to the scrambling code determining unit 105.

The scrambling code determining unit 105 determines whether or not the scrambling code outputted from the scrambling code acquirer 103 matches the scrambling code stored in the scrambling code information storage 107.

Figure 5:
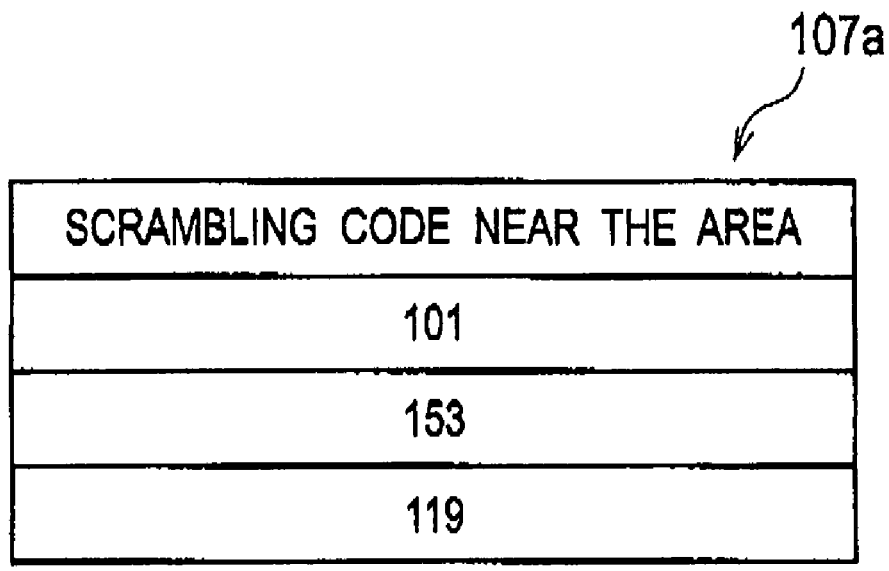
FIG. 5 is an example of scrambling code information according to the embodiment of the present invention.

Specifically, the scrambling code determining unit 105 refers to scrambling code information 107a stored in the scrambling code information storage 107 (not shown in FIG. 1, see FIG. 5). The scrambling code determining unit 105 determines whether or not the scrambling code outputted from the scrambling code acquirer 103 matches the scrambling code contained in the scrambling code information 107a. In this embodiment, the scrambling code determining unit 105 is configured to serve as a spreading code determining unit.

The scrambling code determining unit 105 informs the GPS signal processor 111 of the fact that the scrambling code outputted from the scrambling code acquirer 103 matches the scrambling code contained in the scrambling code information is 107a.

Assume a case where the user of the mobile terminal 100 requests registration of a scrambling code by use of the information input accepting unit 131. Here, the scrambling code determining unit 105 can store, in the scrambling code information storage 107, a scrambling code being outputted from the scrambling code acquirer 103 at the time of the request, as the scrambling code information 107a.

As described above, the scrambling code information storage 107 stores the scrambling code information 107a (see FIG. 5). As shown in FIG. 5, the scrambling code information 107a consists of scrambling codes (SC101, 119, 153) assigned to the sectors near the area A1 where the access point 20A can execute radio communication with the mobile terminal 100.

The scrambling code information 107a includes scrambling codes for sectors formed in an area where the user of the mobile terminal 100 wants to use the connection service provided by the wireless LAN system 2 (e.g., around the user's house). In this embodiment, the scrambling code information 107a consists of scrambling codes for sectors having communicable regions overlapped with the area A1. Note that, the scrambling code information 107a may contain a scrambling code for a sector (e.g., sector 2) which does not have a communicable region overlapped with the area A1 but which is adjacent to the area A1.

The GPS signal processor 111 receives a GPS signal transmitted from the GPS satellite 30. Specifically, the GPS signal processor 111 receives a GPS signal transmitted from the GPS satellite 30 in response to a notification from the scrambling code determining unit 105 that the scrambling code outputted from the scrambling code acquirer 103 matches the scrambling code contained in the scrambling code information 107a.

The GPS signal processor 111 measures the current position of the mobile terminal 100 by use of the received GPS signal. In this embodiment, the GPS signal processor 111 is configured to serve as a position measuring unit. The GPS signal processor 111 outputs the measured current position (latitude/longitude information) of the mobile terminal 100 to the position determining unit 113.

The position determining unit 113 determines whether or not a certain position (e.g., house of the user of the mobile terminal 100) near the access point constituting the wireless LAN system 2 (e.g., access point 20A) is within a predetermined distance from the current position of the mobile terminal 100. The current position is measured by the GPS signal processor a 111.

Figure 6:
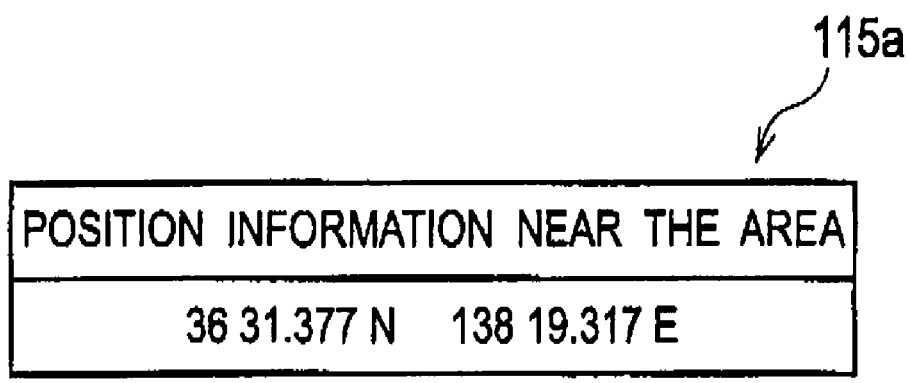
FIG. 6 is an example of GPS position information according to the embodiment of the present invention.

Specifically, the position determining unit 113 refers to GPS position information 115a stored in the GPS position information storage 115 (not shown in FIG. 1, see FIG. 6). The position determining unit 113 determines whether or not a position indicated by the latitude/longitude information (position information) contained in the GPS position information 115a is within a predetermined distance (e.g., 1 km) from the current position of the mobile terminal 100. The current position is outputted from the GPS signal processor 111.

As shown in FIG. 6, the GPS position information 115a includes the latitude/longitude information near the area A1 in which the access point 20A can execute radio communication with the mobile terminal 100 (such as the latitude/longitude information of the house of the user of the mobile terminal 100).

Assume a case where the scrambling code determining unit 105 determines that the scrambling code contained in the received notification matches the scrambling code contained in the scrambling code information 107a (see FIG. 5). In this embodiment, if such determination is made, the position determining unit 113 determines whether or not a position indicated by the latitude/longitude information contained in the GPS position information 115a is within a predetermined distance from the current position of the mobile terminal 100. The current position is outputted from the GPS signal processor 111.

As described above, the scrambling code assigned to the radio base station 10A (sector) is also assigned to the radio a base stations 10B and 10C which are separated from the radio base station 10A by a predetermined distance or more. Hence, the mobile terminal 100 acquires the current position of the mobile terminal 100 by use of the GPS satellite 30, and compares the acquired current position (latitude/longitude information) with the latitude/longitude information contained in the GPS position information 115a. Though this comparison, the mobile terminal 100 determines whether or not the radio base station transmitting the scrambling code (e.g., SC101) contained in the scrambling code information 107a is located in the area A1 formed by the access point 20A.

As described above, the GPS position information storage 115 stores the GPS position information 115a. As shown in FIG. 6, the GPS position information 115a includes the latitude/longitude information (36 31. 377 N, 138 19.317 E) in the area A1.

In this embodiment, the neighboring base station information includes the scrambling code information 107a and the GPS position information 115a. In addition, in this embodiment, a storage for storing the neighboring base station information is configured of the scrambling code information storage 107 and the GPS position information storage 115.

The WLAN communication unit 121 executes radio communication with the access points 20A to 20C constituting the wireless LAN system 2 in accordance with a standard specified in IEEE802.11 (e.g., IEEE802.11g). The WLAN communication unit 121 also receives beacon transmitted from the access points 20A to 20C, and then determines whether or not radio communication is possible between itself and the access points 20A to 20C.

The WLAN controller 123 controls radio communication via the wireless LAN system 2. Particularly in this embodiment, the WLAN controller 123 executes control related to handover between the cellular phone system 1 and the wireless LAN system 2.

Specifically, the WLAN controller 123 executes, via the WLAN communication unit 121, scanning for the beacon contained in the radio signals transmitted from the access points 20A to 20C. The WLAN controller 123 executes the scanning in order to determine whether or not radio communication is possible between itself and the access points 20A to 20C. In this embodiment, the WLAN communication unit 121 and the WLAN controller 123 are configured to serve as a scanning unit.

More specifically, the WLAN controller 123 executes scanning for the beacon in the following case. The scrambling code determining unit 105 determines that the scrambling code outputted from the scrambling code acquirer 103 matches the scrambling code contained in the scrambling code information 107a, and at the same time, the position determining unit 113 determines that a certain position contained in the GPS position information 115a is within a predetermined distance from the current position of the mobile terminal 100, measured by the GPS signal processor 111.

The information input accepting unit 131 accepts various inputs from the user of the mobile terminal 100. Particularly in this embodiment, the information input accepting unit 131 accepts input of the latitude/longitude information in the area A1 (e.g., the user's house) and request for registration of the scrambling code.

Specifically, the latitude/longitude information of the mobile terminal 100 may be measured by the GPS signal processor 111 while the mobile terminal 100 is in the user's house. The information input accepting unit 131 can accept a request to register such latitude/longitude information as the GPS position information 115a (see FIG. 6). In other words, the GPS position information storage 115 stores the latitude/longitude information (position information) accepted by the information input accepting unit 131. In this embodiment, the information input accepting unit 131 is configured to serve as the position information input accepting unit.

Incidentally, the information input accepting unit 131 can register, as the GPS position information 115a, the latitude/longitude information manually inputted by the user by use of operation keys (not shown), instead of the latitude/longitude information measured by the GPS signal processor 111.

The information input accepting unit 131 can also accept, as the scrambling code information 107a (see FIG. 5), a request to register the scrambling code contained in the notification received by the CDMA communication unit 101, while the mobile terminal 100 is near the area A1.

(3) Operation of the Mobile Terminal

An operation of the mobile terminal 100 will now be described. Specifically, explanation will be given on (3.1) acquiring the scrambling code and the position information and (3.2) scanning for the beacon.

(3.1) Acquiring the Scrambling Codes and the Position Information

Figure 3:
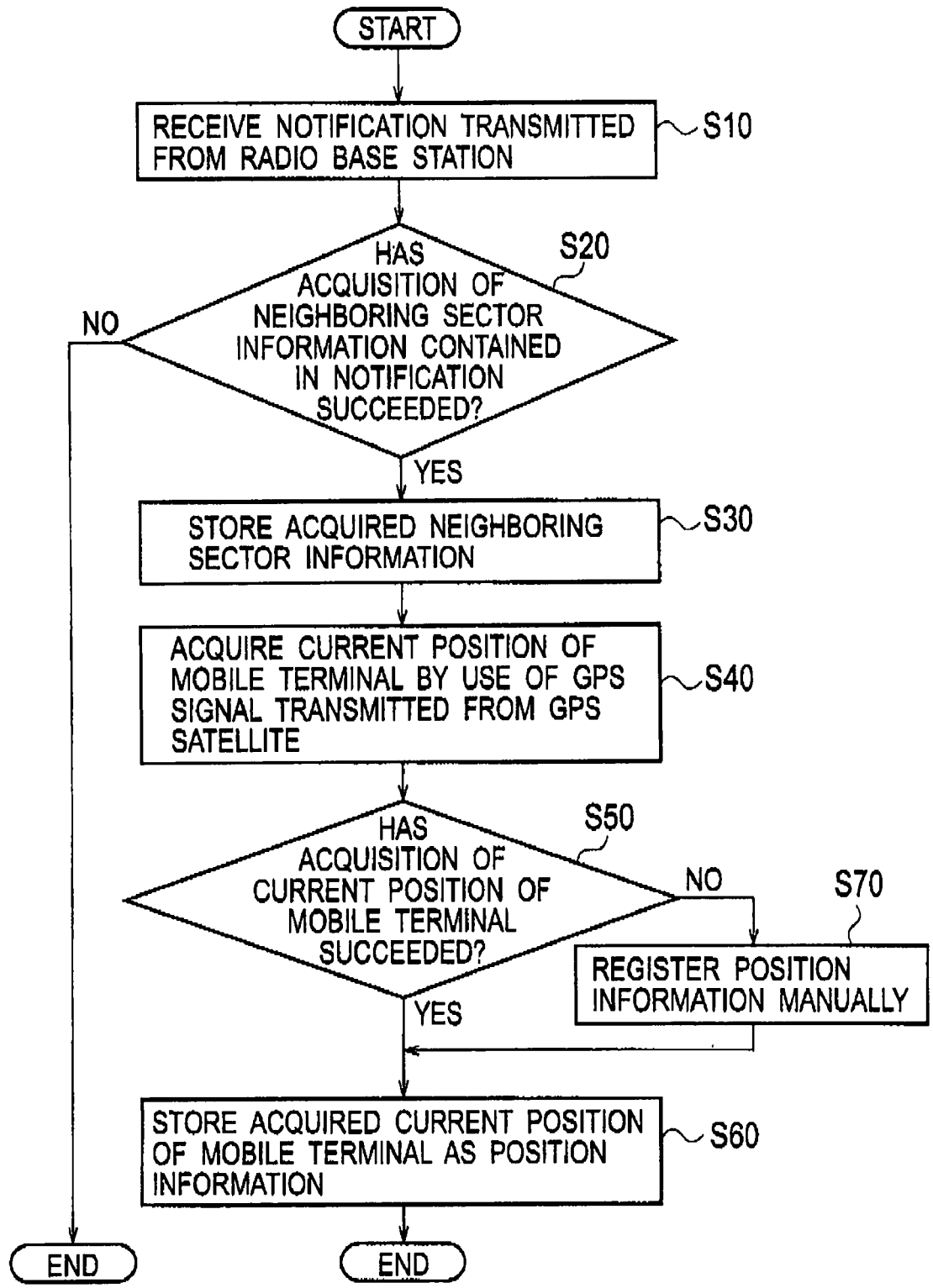
FIG. 3 is a flowchart of the mobile terminal 100 according to the embodiment of the present invention for acquiring a scrambling code and position information.

FIG. 3 is a flowchart of the mobile terminal 100 for acquiring the scrambling codes and the position information. Specifically, the mobile terminal 100 acquires the scrambling codes assigned to the radio base stations (sectors) near the area A1 formed by the access point 20A. The mobile terminal 100 also acquires the position information by use of the GPS satellite 30, that is, the current position (latitude/longitude information) of the mobile terminal 100.

The operation shown in FIG. 3 is executed to previously register the information necessary for use of the connection service in an area where the user of the mobile terminal 100 desires to use the connection service provided by the wireless LAN system 2. In this case, as shown in FIG. 1, the mobile terminal 100 is assumed to be near the radio base station 10A, that is, in the house of the user of the mobile terminal 100.

As shown in FIG. 3, at Step S10, the mobile terminal 100 receives a notification (SIB11) transmitted from the radio base station 10A (sector). As described above, the notification contains the neighboring sector information, that is, the scrambling codes assigned to the sectors formed near the given sector.

At Step S20, the mobile terminal 100 determines whether or not acquisition of the neighboring sector information contained in the received notification has succeeded.

If acquisition of the neighboring sector information has succeeded (YES at Step S20), the mobile terminal 100 stores the acquired neighboring sector information at Step S30. Specifically, the mobile terminal 100 acquires the scrambling codes (SC153, SC119) for sectors as the information of the sectors (sector 3 and sector 4) formed near the radio base station 10A (sector 1). The mobile terminal 100 stores the acquired scrambling codes for the sectors 1, 3 and 4 in the scrambling code information storage 107.

When the received notification does not contain any neighboring sector information, in other words, no sector exists near the sector transmitting the notification, the mobile terminal 100 stores only the scrambling code for the radio base station that has transmitted the notification (own sector) in the scrambling code information storage 107.

If acquisition of the neighboring sector information has not succeeded (NO at Step S20), the mobile terminal 100 terminates the operation of acquiring the scrambling code and the position information. In other words, if the mobile terminal 100 cannot receive the notification from the radio base station (sector) constituting the cellular phone system 1, this means that the area where the user of the mobile terminal 100 desires to use the connection service provided by the wireless LAN system 2 is not covered as the communicable area of the cellular phone system 1.

At Step S40, the mobile terminal 100 acquires the current position of the mobile terminal 100 based on the GPS signal transmitted from the GPS satellite 30.

At Step S50, the mobile terminal 100 determines whether or not acquisition of the current position has succeeded.

If acquisition of the current position of the mobile terminal 100 has succeeded (YES at Step S50), the mobile terminal 100 stores the acquired current position (house of the user of the mobile terminal 100) as the position information at Step S60. Specifically, the mobile terminal 100 stores the latitude/longitude information (36 31.377 N, 138 19.317 E) indicating the acquired current position in the GPS position information storage 115.

If acquisition of the current position of the mobile terminal 100 has not succeeded (NO at Step S50), the user of the mobile terminal 100 manually registers the current position of the mobile terminal 100 at Step S70. The operation at Step S70 is executed in the case where the mobile terminal 100 can acquire the latitude/longitude information indicating the position of the area where the user of the mobile terminal 100 desires to use the connection service provided by the wireless LAN system 2. An example of such an area is the house of the user of the mobile terminal 100. The user of the mobile terminal 100 may also repeat the processing starting from Step S40 outside, for example, where the mobile terminal 100 can receive the GPS signal transmitted from the GPS satellite 30.

(3.2) Operation of Scanning for the Beacon

Figure 4:
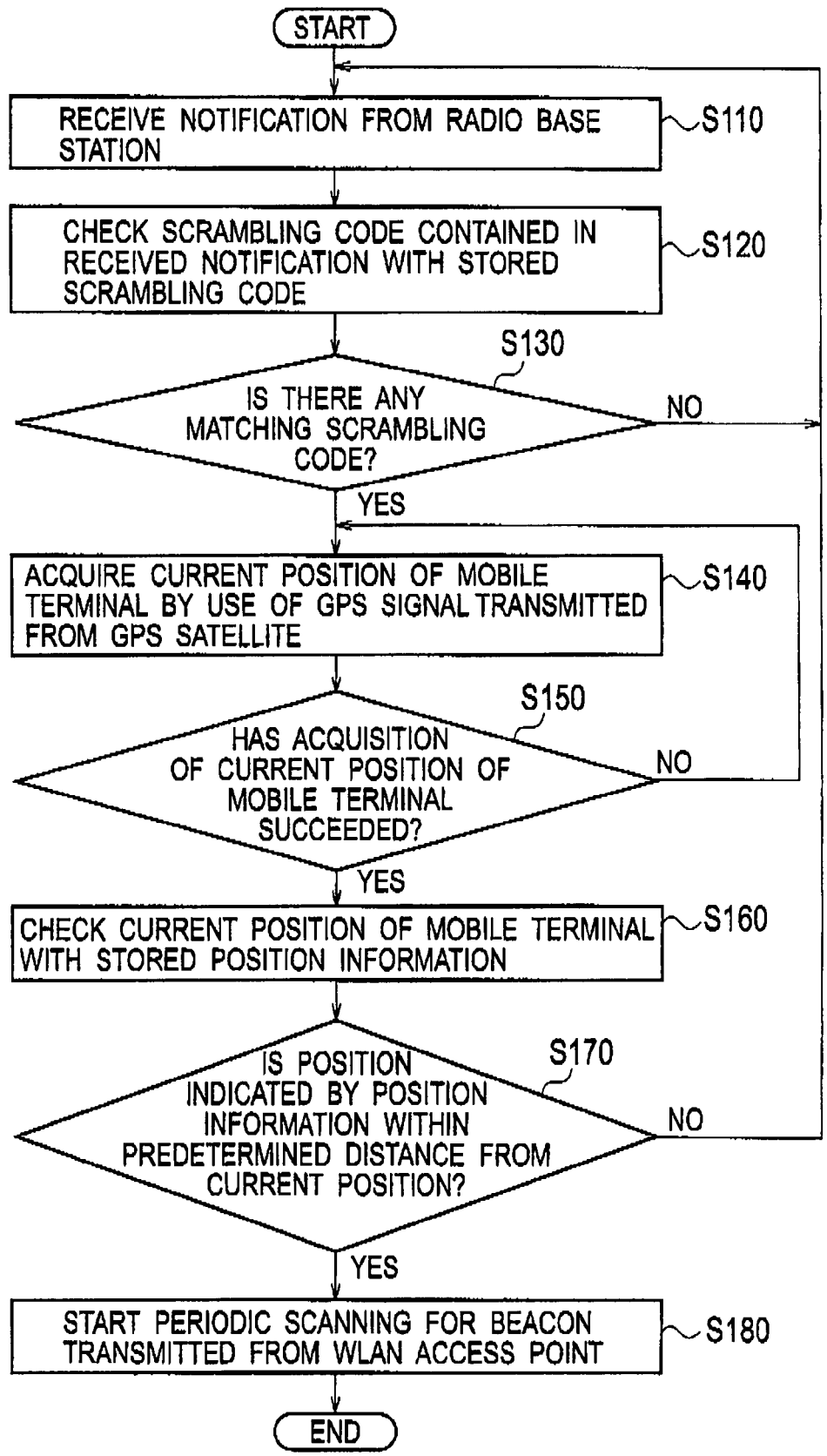
FIG. 4 is a flowchart of the mobile terminal 100 according to the embodiment of the present invention for executing scanning for beacon transmitted from an access point 20A.

FIG. 4 is a flowchart of the mobile terminal 100 for scanning for the beacon transmitted from the access point 20A. Here, the mobile terminal 100 is assumed to be outside the area A1 formed by the access point 20A, and does not execute periodic scanning for the beacon transmitted from the access point 20A.

As shown in FIG. 4, at Step S110, the mobile terminal 100 receives the notification (SIB11) transmitted from the radio base station (sector) constituting the cellular phone system 1.

At Step S120, the mobile terminal 100 checks the scrambling code contained in the received notification with the scrambling code information 107*a* stored in the scrambling code information storage 107 (see FIG. 5).

At Step S130, the mobile terminal 100 determines whether or not the scrambling code information 107*a* includes a scrambling code that matches the scrambling code contained in the notification.

If there is a matching scrambling code (YES at Step S130), at Step S140, the mobile terminal 100 acquires the current position of the mobile terminal 100 based on the GPS signal transmitted from the GPS satellite 30.

If there is no matching scrambling code (NO at Step S130), the mobile terminal 100 repeats the operation starting from Step S110. In other words, if the scrambling code information 107*a* does not include a scrambling code that matches the scrambling code contained in the notification, the mobile terminal 100 does not scan for the beacon transmitted from the access point 20A.

At Step S150, the mobile terminal 100 determines whether or not acquisition of the current position has succeeded.

If acquisition of the current position of the mobile terminal 100 has succeeded (YES at Step S150), at Step S160, the mobile terminal 100 checks the current position of the mobile terminal 100 with the GPS position information 115*a* stored in the GPS position information storage 115 (see FIG. 6). Specifically, the mobile terminal 100 checks the current position of the mobile terminal 100 measured by the GPS signal processor 111 with the position indicated by the latitude/longitude information registered as the GPS position information 115*a*.

If acquisition of the current position of the mobile terminal 100 has not succeeded (NO at Step S150), the mobile terminal 100 repeats the operation starting from Step S140.

At Step S170, the mobile terminal 100 determines whether or not the position (i.e., the house of the user of the mobile terminal 100) indicated by the latitude/longitude information registered as the GPS position information 115*a* (see FIG. 6) is within a predetermined distance (e.g., 1 km) from the current position of the mobile terminal 100.

If the position indicated by the latitude/longitude information registered as the GPS position information 115*a* is within a predetermined distance from the current position of the mobile terminal 100 (YES at Step S170), the mobile terminal 100 starts periodic scanning for the beacon contained in the radio signal transmitted from the access point 20A (e.g., scanning at 1-minute intervals) at Step S180. In other words, if the position indicated by the latitude/longitude information registered as the GPS position information 115*a* is within a predetermined distance from the current position of the mobile terminal 100, the mobile terminal 100 determines that the radio base station assigned the matched scrambling code which was judged at Step S130 is near the area A1.

When the mobile terminal 100 receives the beacon, the mobile terminal 100 can move to a stand-by state in the wireless LAN system 2.

Note that the mobile terminal 100 may execute acquisition of the scrambling codes assigned to the radio base stations (sectors) positioned circumferentially, by using different search intervals.

For example, the notification transmitted from the sector 4 (SC119) positioned within the frame surrounded by thick lines in FIG. 1 contains its own scrambling code (SC) 119 and the scrambling code (neighboring sector information) for the sectors near this sector.

Specifically, the notification contains the SCs for the sectors 7, 6, 2, 5, the SC 101 for the sector 1, and the SC 153 for the sector 3 (sectors sequentially described clockwise from sector 7 formed to the left bottom of sector 4). Similarly, the notification transmitted from other sectors also contains its own scrambling code and the scrambling codes for the sectors near the given sector.

A example will be described in which the mobile terminal 100 sequentially moves from the sector 5, formed to the left bottom of the sector 3 which is overlaps the access point 20B, to the sector 6 and 4 (SC119), until finally connecting to the access point 20A. Note that, it is assumed that the scrambling code information storage 107 of the mobile terminal 100 stores the scrambling codes assigned to the sectors (SC101, 119, 153) near the area A1 formed by the access point 20A.

When the mobile terminal 100 is in the sector 5, it acquires the notification from the sector 5. Since the notification does not contain the information (scrambling code) related to the sector near the access point 20A, the mobile terminal 100 does not execute any scanning for the beacon transmitted from the access point.

Subsequently, when the mobile terminal 100 moves to the sector 6, the notification transmitted from the sector 6 contains the scrambling code (SC119) for the sector 4 as the neighboring sector information for the sector 6. When the mobile terminal 100 receives the scrambling code (SC119) for the sector 4, the mobile terminal 100 determines that it is near the access point 20A, and starts scanning for the beacon transmitted from the access point 20A, at a predetermined cycle (e.g., at 5-minute intervals).

When the mobile terminal 100 further moves from the sector 6 to the sector 4 (SC119), the notification transmitted from the sector 4 contains the scrambling code (SC119) for the sector 4 as the information of the own sector. The scrambling code (SC119) for the sector 4 matches the scrambling code stored in the scrambling code information storage 107, that is, it matches the scrambling code (SC119) assigned to the sector near the area A1.

When the scrambling code of an own sector contained in the notification matches the scrambling code stored in the scrambling code information storage 107, the mobile terminal 100 reduces the interval of scanning for the beacon transmitted from the access point 20A (e.g., 1-minute intervals).

(4) Advantageous Effects

According to the mobile terminal 100, scanning for the radio signals transmitted from the access point 20A (specifically, beacon) is executed in the following case. The scanning is executed when the mobile terminal 100 determines that the scrambling code contained in the notification matches the scrambling code contained in the scrambling code information 107a, and also determines that a certain position indicated by the GPS position information 115a (latitude/longitude information) is within a predetermined distance from the current position of the mobile terminal 100.

As a result, the mobile terminal 100 can scan for the radio signals only when it can receive the radio signal transmitted from the access point 20A, that is, only when it can execute radio communication via the wireless LAN system 2.

Specifically, the mobile terminal 100 can scan for the radio signals transmitted from the access point 20A at an appropriate timing depending on the current position of the mobile terminal 100 even in the following case. That is, scanning can be executed even when the same scrambling code (SC101) assigned to a radio base station constituting the cellular phone system 1 (e.g., radio base station 10A) and also assigned to other radio base stations (e.g., radio base stations 10B, 10C) separated from the radio base station by a predetermined distance or more is repeatedly assigned to different base stations. In other words, although the mobile terminal 100 executes the scanning when it is near the area A1, the mobile terminal 100 does not execute the scanning when it is near the radio base station 10B, even if it receives the same scrambling code from the radio base station 10B.

In addition, the mobile terminal 100 can scan at an appropriate timing by use of an existing radio base station. Thus, massive modification of an existing radio base station (or base station controller), such as a change of a signal format transmitted by the radio base station is unnecessary.

In this embodiment, the mobile terminal 100 determines whether or not a certain position indicated by the GPS position information 115a is within a predetermined distance from the current position of the mobile terminal 100, when it is determined that the scrambling code contained in the notification matches the scrambling code contained in the scrambling code information 107a.

In other words, the mobile terminal 100 measures the current position of the mobile terminal 100, only when it is determined the scrambling code contained in the notification matches the scrambling code contained in the scrambling code information 107a. Accordingly, electric power consumption by the mobile terminal 100 can further be reduced.

In this embodiment, the GPS position information storage 115 can store the latitude/longitude information (such as the position information indicating the position of the house of the user of the mobile terminal 100) accepted by the information input accepting unit 131. As a result, the GPS position information 115a can be registered in the GPS position information storage 115, even if the GPS signal cannot be received from the GPS satellite 30.

On the other hand, if the GPS signal can be received from the GPS satellite 30, the current position of the mobile terminal 100 measured by use of the GPS signal is registered as the GPS position information 115a. Thus, the user of the mobile terminal 100 can easily register the current position information measured by use of the GPS signal as the GPS position information 115a.

(5) Other Embodiments

As described above, the details of the present invention have been disclosed by use of an embodiment of the present invention. However, the descriptions and drawings that constitute a part of the disclosure should not be construed as a limitation to the present invention. Various alternative embodiments will be apparent to those skilled in the art from the disclosure.

For example, in the above-mentioned embodiment, the GPS position information storage 115 is configured to store the latitude/longitude information accepted by the information input accepting unit 131. In the same way, the scrambling code information storage 107 may store the scrambling code inputted by the user of the mobile terminal 100 via the information input accepting unit 131.

In the above-mentioned embodiment, the GPS signal processor 111 is provided to the mobile terminal 100. However, the GPS signal processor 111 need not be always provided.

In the above-mentioned embodiment, the mobile terminal 100 determines whether or not a certain position indicated by the GPS position information 115a is within a predetermined distance from the current position of the mobile terminal 100, when it is determined that the scrambling code contained in the notification matches the scrambling code contained in the scrambling code information 107. However, the determination on whether or not a certain position indicated by the GPS position information 115a is within a predetermined distance from the current position of the mobile terminal 100 may also be made when the scrambling code contained in the notification does not match the scrambling code contained in the scrambling code information 107a.

In the above-mentioned embodiment, the cellular phone system 1 employing a sector configuration has been described as an example. Needless to say, the present invention may be applied to a cellular phone system employing a cell configuration. The radio communication system to which the present invention is applicable is not limited to that described in the above-mentioned embodiment.

Hence, it is clear that the present invention includes various embodiments that are not herein described. Accordingly, the technical scope of the present invention is defined only by patent features related to the scope of the claims that are reasonably understood from the above-mentioned a description.

Note that the entire contents of the Japanese Patent Application No. 2007-186063, filed on Jul. 17, 2007, are incorporated herein by reference.

What is claimed is:

1. A mobile terminal connectable to a first radio communication system according to the Code Division a Multiple Access standard, and a second radio communication system which has a different radio communication scheme from the first radio communication system and which includes a second radio base station, the mobile terminal comprising:
   a notification receiver configured to receive a notification containing a spreading code from a first radio base station constituting the first radio communication system, the spreading code being assigned to the first radio base station and also assigned to another radio base station which is separated from the first radio base station by a predetermined distance or more;
   a storage configured to store neighboring base station information in which position information indicating the second radio base station and a certain position near the second radio base station is associated with a spreading code contained in the neighboring base station information;
   a position measuring unit configured to measure a current position of the mobile terminal;
   a spreading code determining unit configured to determine whether or not the spreading code contained in the notification received by the notification receiver matches the spreading code contained in the neighboring base station information;
   a position determining unit configured to determine whether or not the certain position indicated by the position information contained in the neighboring base station information is within a predetermined distance from the current position measured by the position measuring unit; and
   a scanning unit configured to execute scanning for radio signals transmitted from the second radio base station, if the spreading code determining unit determines that the spreading code contained in the notification matches the spreading code contained in the neighboring base station information, and also if the position determining unit determines that the certain position indicated by the position information is within the predetermined distance from the current position.

2. The mobile terminal according to claim 1, wherein the position determining unit determines whether or not the certain position indicated by the position information is within the predetermined distance from the current position, if the spreading code determining unit determines that the spreading code contained in the notification matches the spreading code contained in the neighboring base station information.

3. The mobile terminal according to claim 1 further comprising a position information input accepting unit configured to accept input of the position information, wherein
   the storage stores the position information accepted by the position information input accepting unit.

4. The mobile terminal according to claim 1, wherein the position measuring unit measures the current position with use of a signal from a GPS satellite.

5. A method for executing scanning for radio signals, for a mobile terminal connectable to a first radio communication system according to a Code Division Multiple Access standard, and a second radio communication system which has a different radio communication scheme from the first radio communication system and which includes a second radio base station, the method comprising the steps of:
   receiving a notification containing a spreading code from a first radio base station constituting the first radio communication system, the spreading code being assigned to the first radio base station and also assigned to another radio base station which is separated from the first radio base station by a predetermined distance or more;
   storing neighboring base station information in which position information indicating the second radio base station and a certain position near the second radio base station is associated with a spreading code contained in the neighboring base station information;
   measuring a current position of the mobile terminal;
   determining whether or not the spreading code contained in the received notification matches the spreading code contained in the neighboring base station information;
   determining whether or not the certain position indicated by the position information contained in the neighboring base station information is within a predetermined distance from the measured current position; and
   scanning radio signals transmitted from the second radio base station, if it is determined that the spreading code contained in the notification matches the spreading code contained in the neighboring base station information, and also if it is determined that the certain position indicated by the position information is within the predetermined distance from the current position.

* * * * *